United States Patent
Bai et al.

(10) Patent No.: US 12,478,550 B2
(45) Date of Patent: Nov. 25, 2025

(54) COMPOSITE FILM OF ORAL LIQUID PHARMACEUTICAL PACKAGING AND PREPARATION METHOD

(71) Applicant: Sichuan Huili Industry Co., Ltd., Sichuan (CN)

(72) Inventors: Jinzhi Bai, Sichuan (CN); Wanling Lan, Sichuan (CN); Yan Jiang, Sichuan (CN); Daiguo Zhao, Sichuan (CN); Xiaocong Pu, Sichuan (CN); Daiqun Yuan, Sichuan (CN); Xinxing Zhu, Sichuan (CN); Zhongming Li, Sichuan (CN)

(73) Assignee: Sichuan Huili Industry Co., Ltd., Sichuan (CN)

( * ) Notice: Subject to any disclaimer, the term of this patent is extended or adjusted under 35 U.S.C. 154(b) by 385 days.

(21) Appl. No.: 18/184,398

(22) Filed: Mar. 15, 2023

(65) Prior Publication Data
US 2024/0216219 A1    Jul. 4, 2024

(30) Foreign Application Priority Data
Jan. 3, 2023  (CN) .......................... 202310002115.3

(51) Int. Cl.
*A61J 1/10*     (2006.01)
*A61J 1/14*     (2023.01)

(52) U.S. Cl.
CPC .............. *A61J 1/10* (2013.01); *A61J 1/1468* (2015.05)

(58) Field of Classification Search
None
See application file for complete search history.

(56) References Cited

U.S. PATENT DOCUMENTS

| | | | | |
|---|---|---|---|---|
| 4,622,360 | A | * 11/1986 | Gomi .................. | C08G 18/838 524/871 |
| 2017/0057209 | A1 | * 3/2017 | Omori ................. | B32B 27/308 |

FOREIGN PATENT DOCUMENTS

| | | | | |
|---|---|---|---|---|
| CN | 204585995 U | * | 8/2015 | ........... B32B 15/085 |
| CN | 109836591 A | * | 6/2019 | ............. C08G 18/08 |

OTHER PUBLICATIONS

Wu—CN 204585995 U—CN D1—MT—mold-aluminum-mold composite—2015 (Year: 2015).*
Ge—CN 109836591 A—CN D3—MT—aqueous polyurethane emulsion—2019 (Year: 2019).*

* cited by examiner

*Primary Examiner* — John Vincent Lawler
(74) *Attorney, Agent, or Firm* — SALIWANCHIK, LLOYD & EISENSCHENK

(57) ABSTRACT

The present disclosure discloses the composite film of oral liquid pharmaceutical packaging and the preparation method, the composite film comprises a polyester layer, an aluminum foil layer and a heat-sealing layer; the polyester layer and the aluminum foil layer, and the aluminum foil layer and the heat-sealing layer are both bonded with an adhesive agent; the adhesive agent is an aqueous polyurethane prepared from an aqueous polyurethane emulsion, citric acid, acetic acid and zirconium carbonate amine with a mass ratio of 100:1:1:10~15. The present disclosure adopts carboxylic acid type aqueous polyurethane emulsion, citric acid, acetic acid and zirconium carbonate amine to prepare aqueous polyurethane, the zirconium metal can form stable complex system with citric acid, acetic acid and aqueous polyurethane emulsion, so that aqueous polyurethane emulsion can be demulsified and cured rapidly, shortening curing time, reducing curing temperature.

11 Claims, No Drawings

COMPOSITE FILM OF ORAL LIQUID PHARMACEUTICAL PACKAGING AND PREPARATION METHOD

CROSS REFERENCE TO RELATED APPLICATION

This application claims priority to Chinese Patent Application No. 202310002115.3, filed on Jan. 3, 2023, the disclosure of which is herein incorporated by reference in its entirety.

TECHNICAL FIELD

The present disclosure relates to a pharmaceutical packaging technology, in particular to a composite film of oral liquid pharmaceutical packaging and a preparation method.

BACKGROUND

At present, the liquid drug packaging commonly used in the pharmaceutical field is hard packaging, including glass bottles and plastic containers made of composite hard sheets, glass bottles have the disadvantages of large weight and fragile, and plastic containers generally need the bottom support as the support of plastic containers, when in use, it is need to unscrew the top of the plastic container, and then squeeze the liquid out for oral administration, with many materials, and inconvenient to use.

In order to improve the convenience of the use of liquid packaging, composite film bags are currently used to contain liquid drugs, the composite film generally adopts multi-layer composite film, mostly composed of an outer layer, a barrier layer and a heat-sealing layer, representative composite film is polyester layer PET-Al-polypropylene casting layer (CPP), and the layers are bonded together with adhesive agent. The adhesive agent mainly adopts polyurethane adhesive, the polyurethane adhesive has solvent polyurethane and aqueous polyurethane, due to the use of organic solvents in the preparation process, in process of the production and use of the solvent polyurethane will have a certain impact on the environment and personnel. In recent years, with the improvement of environmental protection requirements, aqueous polyurethane based on aqueous system has been developed rapidly. However, when aqueous polyurethane is used to bond multi-layer composite film, in the later curing process, water is not volatile through the film, which requires a high curing temperature and a long curing time, leading to a large energy consumption, and also limits the application of water-based polyurethane in the preparation of liquid pharmaceutical packaging composite film.

SUMMARY

In order to solve the above problems, the present disclosure aims to provide a composite film of oral liquid pharmaceutical packaging and a preparation method, which is conducive to the volatilization of water solvent during the curing process, reduces the curing temperature, and reduces the production energy consumption.

The present disclosure is implemented by using following technical solutions:

A composite film of oral liquid pharmaceutical packaging, wherein the composite film comprises a polyester layer, an aluminum foil layer and a heat-sealing layer; the polyester layer and the aluminum foil layer, and the aluminum foil layer and the heat-sealing layer are both bonded with an adhesive agent; the adhesive agent is an aqueous polyurethane prepared from aqueous polyurethane emulsion, citric acid, acetic acid and zirconium carbonate amine; the aqueous polyurethane emulsion is carboxylic acid type, and the aqueous polyurethane emulsion, citric acid, acetic acid and zirconium carbonate amine solution are 100:1:1:10~15 according to the mass ratio.

Citric acid, acetic acid and carboxylic acid aqueous polyurethane emulsion can all complex with zirconium metal in zirconium carbonate amine to form complex, zirconium carbonate amine exists at room temperature, when heated during curing, zirconium carbonate amine is easy to decompose and form ammonia gas, and the zirconium metal complexes with citric acid, acetic acid and aqueous polyurethane emulsion, so that aqueous polyurethane emulsion can be demulsified and cured rapidly, shortening curing time and reducing curing temperature; and because ammonia is easy to volatilize, part of the water is taken away during the volatilization process, thereby reducing the difficulty of water volatilization through the film; citric acid is ternary acid, acetic acid is monoacid, aqueous polyurethane emulsion is carboxylic acid type, with different complexation constants, the three synergistic with zirconium metal complexation to form a more stable complexation system, which is more conducive to the uniform demulsification and step-by-step stable demulsification of aqueous polyurethane emulsion in the curing process, better curing effect, and promote the reduction of curing temperature. In the ratio of aqueous polyurethane, increasing the amount of zirconium carbonate amine on the one hand is conducive to generate more ammonia to take away water, shortening the curing time and curing temperature, and on the other hand, provides enough zirconium metal to form a stable multistage complex system, which is conducive to the curing process.

Preferably, the solid content of the aqueous polyurethane emulsion is 45%, the water content of the citric acid is less than or equal to 1.0%, and the acetic acid is anhydrous acetic acid. By increasing the solid content of aqueous polyurethane emulsion and reducing the water content of citric acid and acetic acid, the water content of moisture polyurethane can be reduced and the difficulty of water volatilization in the subsequent fixing process can be reduced.

Preferably, the preparation process of the aqueous polyurethane emulsion comprises:
(1) adding polyester ternary alcohol to a sealed dispersion kettle, and then adding aliphatic polyisocyanate, small molecule chain extender, cross-linking agent, hydrophilic chain extender;
(2) controlling the temperature between 55° C. and 70° C. for 2 hours;
(3) reducing the temperature to 25° C., and adding neutralizing agent for neutralization;
(4) adding deionized water, stirring at high speed for emulsification, and adding post-chain extender to prepare the aqueous polyurethane emulsion;
wherein the weight ratio of the polyester ternary alcohol, aliphatic polyisocyanate, small molecule chain extender, cross-linking agent, hydrophilic chain extender, neutralizing agent and post-chain extender is 100:10~20:1~2:1~2:10~14:4~6:1~2.

Preferably, the polyester ternary alcohol is polycarbonate ternary alcohol, and the aliphatic polyisocyanate is dicyclohexylmethane diisocyanate. In the preparation of aqueous polyurethane emulsion, polycarbonate ternary alcohol is used as the soft segment of polyurethane, because the soft segment with an ester group can form hydrogen bonds with the hard segment of polyurethane, which is conducive to the formation of aqueous polyurethane emulsion with higher solid content, and further promotes the shortening of the curing time of pharmaceutical packaging composite film during the curing process.

Preferably, the small molecule chain extender is ethylene glycol, the crosslinking agent is trimethylol propane, the hydrophilic chain extender is dimethylolbutanoic acid, the neutralizing agent is triethylamine, and the post-chain extender is ethylenediamine.

Preferably, the coating weight of the adhesive agent between the polyester layer and the aluminum foil layer is 4 $g/m^2$~5 $g/m^2$, and the coating weight of the adhesive agent between the aluminum foil layer and the heat-sealing layer is 7 $g/m^2$~8 $g/m^2$.

Preferably, the thickness of the polyester layer is 1.5 µm.

Preferably, the thickness of the aluminum foil layer is 6 µm.

Preferably, the heat-sealing layer is polypropylene casting layer, and the thickness of the heat-sealing layer is 25 µm.

The present disclosure also provides a preparation method of the composite film of oral liquid pharmaceutical packaging, wherein the preparation method comprises the following steps:

mixing the aqueous polyurethane emulsion with citric acid and acetic acid, adjusting the pH of the system to 7~8, and adding the zirconium carbonate amine solution and mixing evenly to obtain the aqueous polyurethane; bonding the polyester layer with the aluminum foil layer through aqueous polyurethane to obtain a first composite film; bonding the first composite film with the heat-sealing layer through aqueous polyurethane to obtain a second composite film; curing the second composite film.

Compared with the prior art, the present disclosure has the following advantages and beneficial effects:

The composite film of oral liquid pharmaceutical packaging provided by the present disclosure adopts carboxylic acid type aqueous polyurethane emulsion, citric acid, acetic acid and zirconium carbonate amine to prepare aqueous polyurethane, which can be heated at a low temperature to volatilize ammonia gas and then bring out part of water, and the zirconium metal can form stable complex system with citric acid, acetic acid and aqueous polyurethane emulsion, so that aqueous polyurethane emulsion can be demulsified and cured rapidly, shortening curing time, reducing curing temperature, and then reducing energy consumption, and greatly improving the application of water-based polyurethane in the preparation of liquid pharmaceutical packaging composite film.

DETAILED DESCRIPTION

The present disclosure is further described with examples to make the purpose, technical scheme and advantages of the present disclosure more clear. The schematic examples of the present disclosure and their descriptions are only used to explain the present disclosure, and are not used to limit the present disclosure.

Example 1

This example provides the composite film of oral liquid pharmaceutical packaging, the composite film comprises a polyester layer, an aluminum foil layer and a heat-sealing layer (cast polypropylene), the polyester layer and the aluminum foil layer, and the aluminum foil layer and the heat-sealing layer are both bonded with the adhesive agent; the preparation process of the aqueous polyurethane emulsion comprises the steps as follows:

(1) adding 100 parts polycarbonate ternary alcohol to the sealed dispersion kettle, and then adding 10 parts dicyclohexylmethane diisocyanate, 1 part ethylene glycol, 1 part trimethylol propane, 10 parts dimethylolbutanoic acid;

(2) controlling the temperature at 55° C. for 2 hours;

(3) reducing the temperature to 25° C., and adding 4 parts neutralizing agent triethylamine for neutralization;

(4) adding deionized water, stirring at high speed for emulsification, and adding 1 part ethylenediamine to prepare the aqueous polyurethane emulsion;

(5) mixing 100 parts of the prepared aqueous polyurethane emulsion with 1 part citric acid with a water content of 1% and 1 part anhydrous acetic acid, adjusting the pH of the system to 7, and adding 10 parts zirconium carbonate amine solution and mixing evenly to obtain the aqueous polyurethane.

The preparation method of composite film of oral liquid pharmaceutical packaging comprises the steps as follows:

transferring the polyester layer PET substrate with a thickness of 1.5 µm to the unwinding place of the dry laminating machine, controlling unwinding into the gluing process to coat the aqueous polyurethane glue on the inside of the PET substrate with the amount of glue controlled at 4 $g/m^2$, and then laminating the aluminum foil layer with a thickness of 6 µm with polyester layer by aqueous polyurethane to obtain the first composite film, drying the first composite film in the drying oven with temperature of 45° C.;

transferring the first composite film to the unwinding place of the dry laminating machine, controlling unwinding into the gluing process to coat the aqueous polyurethane glue on the aluminum foil layer with the amount of glue controlled at 4 $g/m^2$, and then laminating the CPP layer with a thickness of 25 µm with the first composite film to obtain the second composite film, drying the second composite film in the drying oven with temperature of 50° ° C.; and then controlling winding;

curing the dried second composite film in the curing chamber for 60 h at 50° C.

Example 2

The difference between this example and Example 1 is that the amount of each raw material in the aqueous polyurethane emulsion is different: 100 parts polycarbonate ternary alcohol, 20 parts dicyclohexylmethane diisocyanate, 2 parts ethylene glycol, 2 parts trimethylol propane, 14 parts dimethylolbutanoic acid, 6 parts neutralizing agent triethylamine, 2 parts ethylenediamine.

Example 3

The difference between this example and Example 1 is that: 100 parts aqueous polyurethane emulsion, 1 part citric acid, 1 part anhydrous acetic acid, 15 parts zirconium carbonate amine solution.

Example 4

The difference between this example and Example 1 is that: 100 parts aqueous polyurethane emulsion, 1 part citric acid, 1 part anhydrous acetic acid, 5 parts zirconium carbonate amine solution.

Example 5

The difference between this example and Example 1 is that: 100 parts aqueous polyurethane emulsion, 1 part citric acid, 1 part anhydrous acetic acid, 25 parts zirconium carbonate amine solution.

Example 6

The difference between this example and Example 1 is that: the aqueous polyurethane only consists of aqueous polyurethane emulsion, without citric acid, acetic acid and zirconium carbonate amine solution.

Example 7

The difference between this example and Example 1 is that: the aqueous polyurethane is prepared by aqueous polyurethane emulsion and zirconium carbonate amine solution, without citric acid, acetic acid.

Example 8

The difference between this example and Example 1 is that: the aqueous polyurethane is prepared by aqueous polyurethane emulsion, citric acid and zirconium carbonate amine solution, without acetic acid.

Example 9

The difference between this example and Example 1 is that: the thickness of polyester layer is 2 μm, the thickness of heat-sealing layer is 30 μm.

The temperature and time used to complete the curing of the second composite film prepared in Examples 1-9 in the curing chamber are shown in Table 1 respectively:

TABLE 1

Curing temperature and curing time in each example

| Serial number | Curing temperature (° C.) | Curing time (h) |
|---|---|---|
| Example 1 | 50 | 60 |
| Example 2 | 52 | 58 |
| Example 3 | 50 | 60 |
| Example 4 | 65 | 78 |
| Example 5 | 68 | 72 |
| Example 6 | 70 | 90 |
| Example 7 | 65 | 80 |
| Example 8 | 70 | 80 |
| Example 9 | 70 | 72 |

It can be seen from Table 1 that zirconium carbonate amine synergized with citric acid, acetic acid and carboxylic acid type aqueous polyurethane emulsion in Examples 1 to 3 reduces the curing temperature of the composite film to about 50° C., and the curing time is greatly shortened, which can be completed in up to 60 h. However, in Example 4 and Example 5, zirconium metal cannot form a better complexing system with citric acid, acetic acid and carboxylic acid type aqueous polyurethane emulsion due to the small or large amount of zirconium carbonate amine solution, resulting in the need to use higher temperature and longer time to achieve the desired curing effect. Example 6 uses conventional aqueous polyurethane, which requires a higher curing temperature and a longer curing time. In Example 7 and Example 8, zirconium carbonate amine, citric acid and acetic acid do not exist at the same time, the complex system of zirconium carbonate synergizing with citric acid, acetic acid and carboxylic acid type aqueous polyurethane emulsion cannot be formed, which cannot effectively reduce the curing temperature and curing time, therefore the effects of Examples 7 and 8 are not as good as those of Examples 1-3. In Example 9, the thickness of polyester layer and heat-sealing layer is increased, which has a certain influence on the curing time and temperature.

The performance test of the composite film prepared in above Examples 1 to 9 are tested, the testing process is as follows:

1. Testing the water vapor transmittance of the composite membrane: taking an appropriate amount of composite film products, putting them in a heat-sealing instrument, scaling on three sides first to form a bag with a heat-sealing temperature of 150° C.~170° C., a pressure of 0.2~0.3 MPa, and a time of 1 second to make the bag heat synthesized into a three-sided rectangular heat-sealing bag with a size of (10±0.5 cm)*(5±0.25 cm); filling 8 ml~20 ml water to drain the gas in the bag, and heat-sealing the fourth side of the bag; preparing eight bags by the same method, and placing for 14 days according to the third method (1) of the water vapor transmittance method (YBB00092003) at a temperature of 40±2° C. and a relative humidity of 25%±5%.
2. Testing the oxygen transmittance: taking the composite film products, and testing them according to the provisions of the first method or the second method of gas transmittance determination method (YBB00082003-2015).
3. Testing the peeling strength of Al layer and PET layer: taking the composite film products, and testing them according to the standard peel strength determination method (YBB00102003-2015) inspection issued by State Food and Drug Administration. The peeling strength of Al layer and PET layer examines whether the bonding firmness and the uniformity of adhesive coating of packaging materials are guaranteed during the production process.
4. Testing the heat-sealing strength: taking the composite film products, cutting four 100 mm*100 mm test pieces, superimposing any two test pieces composite film surfaces, placing on the heat-sealing instrument (heat-sealing temperature 150° ° C.~170° C., pressure 0.2~0.3 MPa, time 1 second) for heat-sealing, and testing them according to the heat-sealing strength determination method (YBB00122003-2015). The heat-sealing strength examines the strength of the composite film bag at the sealing place after loading drug, which is directly related to the protective ability of the packaging material to the loaded drug.

The test results are shown in Table 2.

TABLE 2

Performance test results of composite membranes prepared in Examples 1-9

| Serial number | Water vapor transmittance g/(m² · 24 h) | Oxygen transmittance cm³/(m² · 24 h · 0.1 MPa) | Peeling strength N/15 mm (Vertical/ horizontal) | Heat-sealing Strength (Vertical/ horizontal) |
|---|---|---|---|---|
| Example 1 | 0.15 | 0.06 | 12.8/12.5 | 68/63 |
| Example 2 | 0.16 | 0.05 | 12.6/12.5 | 62/65 |
| Example 3 | 0.15 | 0.05 | 12.5/12.8 | 65/63 |

TABLE 2-continued

Performance test results of composite membranes prepared in Examples 1-9

| Serial number | Water vapor transmittance g/(m² · 24 h) | Oxygen transmittance cm³/(m² · 24 h · 0.1 MPa) | Peeling strength N/15 mm (Vertical/ horizontal) | Heat-sealing Strength (Vertical/ horizontal) |
|---|---|---|---|---|
| Example 4 | 0.19 | 0.07 | 10.8/10.9 | 62/60 |
| Example 5 | 0.19 | 0.07 | 10.8/10.1 | 60/63 |
| Example 6 | 0.22 | 0.09 | 9.5/9.1 | 63/63 |
| Example 7 | 0.23 | 0.09 | 9.8/9.2 | 61/60 |
| Example 8 | 0.20 | 0.08 | 9.9/9.4 | 62/59 |
| Example 9 | 0.16 | 0.06 | 12.3/12.0 | 66/63 |

It can be seen from Table 2 that the water vapor transmission, oxygen transmission, peeling strength and heat-sealing strength of the composite film prepared by Examples 1-9 all meet the requirements. However, there is a certain gap between examples in the peeling strength of Al layer and PET layer: the peeling strength of Al layer and PET layer of the composite film in Examples 1-3 is at a high level, and the water-based polyurethane adhesive of the composite film on the surface of Examples 1-3 is firmly bonded and the adhesive is relatively uniform after curing; the peeling strength of Al layer and PET layer of the composite film in Examples 4-8 is significantly lower than that of the composite film in Examples 1-3, indicating that when a good complex system of zirconium carbonate synergizing with citric acid, acetic acid and carboxylic acid type aqueous polyurethane emulsion is not formed in the adhesive, the uniform performance of the cured adhesive is not good, thus affecting the adhesion firmness between the Al layer and the PET layer, thereby affecting the peel strength.

The stability of the composite film prepared in Examples 1-3 is tested in accordance with the "Guiding Principles for the Study of the Stability of Plastic and Rubber Drug Packet Materials" (draft for comments). Using the conditions of accelerated equivalence of the Guiding Principles, 60° C./10% is selected for the experiment, and 0 d/20 d/40 d/60 d/96 d are examined. Specific temperature and humidity settings: 60° C.±2° C./10%±5% RH. The results are shown in Table 3.

TABLE 3

The stability of the composite film prepared in Examples 1-3

| Serial number | Examination time | Water vapor transmittance g/(m² · 24 h) | Oxygen transmittance cm³/(m² · 24 h · 0.1 MPa) | Peeling strength N/15 mm (Vertical/ horizontal) | Heat-sealing Strength (Vertical/ horizontal) |
|---|---|---|---|---|---|
| Example 1 | 0 d | 0.15 | 0.06 | 12.8/12.5 | 68/63 |
|  | 20 d | 0.15 | 0.06 | 12.8/12.4 | 68/63 |
|  | 40 d | 0.15 | 0.06 | 12.8/12.4 | 66/62 |
|  | 60 d | 0.15 | 0.07 | 12.3/12.2 | 66/63 |
|  | 96 d | 0.16 | 0.07 | 12.2/12.1 | 64/62 |
| Example 2 | 0 d | 0.16 | 0.05 | 12.6/12.5 | 62/65 |
|  | 20 d | 0.16 | 0.05 | 12.6/12.5 | 62/63 |
|  | 40 d | 0.17 | 0.07 | 12.5/12.3 | 61/62 |
|  | 60 d | 0.17 | 0.07 | 12.3/12.4 | 61/62 |
|  | 96 d | 0.19 | 0.08 | 12.2/12.2 | 61/60 |
| Example 3 | 0 d | 0.15 | 0.05 | 12.5/12.8 | 65/63 |
|  | 20 d | 0.15 | 0.05 | 12.5/12.8 | 65/63 |
|  | 40 d | 0.15 | 0.06 | 12.2/12.5 | 64/63 |
|  | 60 d | 0.15 | 0.06 | 12.2/12.4 | 64/64 |
|  | 96 d | 0.16 | 0.06 | 12.2/12.2 | 62/63 |

It can be seen from Table 3, the composite films obtained in Examples 1-3 have good stability.

The above examples further elaborate on the object, technical solution and beneficial effects of the present disclosure, it should be understood that the above examples are only specific examples of the present disclosure, and are not used to limit the scope of protection of the present disclosure. Any modification, equivalent replacement, improvement, etc. made within the spirit and principles of the present disclosure should be included in the scope of protection of the present disclosure.

What is claimed is:

1. A composite film of oral liquid pharmaceutical packaging, the composite film comprising a polyester layer, an aluminum foil layer and a heat-sealing layer; wherein
    the polyester layer and the aluminum foil layer, and the aluminum foil layer and the heat-sealing layer are both bonded with an adhesive agent;
    the adhesive agent is an aqueous polyurethane prepared from a mixture of aqueous polyurethane emulsion, citric acid, acetic acid, and zirconium carbonate amine; and
    the aqueous polyurethane emulsion is a carboxylic acid type, and the aqueous polyurethane emulsion, citric acid, acetic acid, and zirconium carbonate amine mixture are 100:1:1:10~15 according to mass ratio.

2. The composite film of oral liquid pharmaceutical packaging according to claim 1, wherein a solid content of the aqueous polyurethane emulsion is 45%, a water content of the citric acid is less than or equal to 1.0%, and the acetic acid is anhydrous acetic acid.

3. The composite film of oral liquid pharmaceutical packaging according to claim 2, wherein the preparation process of the aqueous polyurethane emulsion comprises:
    (1) adding polyester ternary alcohol to a sealed dispersion kettle, and then adding aliphatic polyisocyanate, small molecule chain extender, cross-linking agent, hydrophilic chain extender;
    (2) controlling the temperature between 55° C. and 70° C. for 2 hours;
    (3) reducing the temperature to 25° C., and adding neutralizing agent for neutralization;
    (4) adding deionized water, stirring at high speed for emulsification, and adding post-chain extender to prepare the aqueous polyurethane emulsion;
    wherein a weight ratio of the polyester ternary alcohol, aliphatic polyisocyanate, small molecule chain extender, cross-linking agent, hydrophilic chain extender, neutralizing agent, and post-chain extender is 100:10~20:1~2:1~2:10~14:4~6:1~2.

4. The composite film of oral liquid pharmaceutical packaging according to claim 3, wherein the polyester ternary alcohol is polycarbonate ternary alcohol, and the aliphatic polyisocyanate is dicyclohexylmethane diisocyanate.

5. The composite film of oral liquid pharmaceutical packaging according to claim 4, wherein the small molecule chain extender is ethylene glycol, the crosslinking agent is trimethylol propane, the hydrophilic chain extender is dimethylolbutanoic acid, the neutralizing agent is triethylamine, and the post-chain extender is ethylenediamine.

6. The composite film of oral liquid pharmaceutical packaging according to claim 5, wherein a coating weight of the adhesive agent between the polyester layer and the aluminum foil layer is 4 g/m²~5 g/m², and a coating weight of the adhesive agent between the aluminum foil layer and the heat-sealing layer is 7 g/m²~8 g/m².

7. The composite film of oral liquid pharmaceutical packaging according to claim 6, wherein a thickness of the polyester layer is 1.5 μm.

8. The composite film of oral liquid pharmaceutical packaging according to claim 7, wherein a thickness of the aluminum foil layer is 6 μm.

9. The composite film of oral liquid pharmaceutical packaging according to claim 8, wherein the heat-sealing layer is polypropylene casting layer, and a thickness of the heat-sealing layer is 25 μm.

10. A preparation method of composite film of oral liquid pharmaceutical packaging according to claim 1, wherein the preparation method comprises:
   mixing the aqueous polyurethane emulsion with citric acid and acetic acid, adjusting the pH of the mixture to 7~8, and adding the zirconium carbonate amine and mixing evenly to obtain the aqueous polyurethane;
   bonding the polyester layer with the aluminum foil layer through aqueous polyurethane to obtain a first composite film;
   bonding the first composite film with the heat-sealing layer through aqueous polyurethane to obtain a second composite film; and
   curing the second composite film.

11. A preparation method of composite film of oral liquid pharmaceutical packaging according to claim 2, wherein the preparation method comprises:
   mixing an aqueous polyurethane emulsion having a solid content of 45% with citric acid having a water content of less than or equal to 1% and anhydrous acetic acid, adjusting the pH of the mixture to 7~8, and adding the zirconium carbonate amine and mixing evenly to obtain the aqueous polyurethane;
   bonding the polyester layer with the aluminum foil layer through aqueous polyurethane to obtain a first composite film;
   bonding the first composite film with the heat-sealing layer through aqueous polyurethane to obtain a second composite film; and
   curing the second composite film.

* * * * *